(12) United States Patent
Xu

(10) Patent No.: US 12,416,091 B1
(45) Date of Patent: Sep. 16, 2025

(54) SILVER ION STERILIZATION SOLUTION PREPARATION SYSTEM

(71) Applicant: Guangdong Kailian Electronic Technology Co., Ltd, Jieyang (CN)

(72) Inventor: Weiqi Xu, Jieyang (CN)

(73) Assignee: Guangdong Kailian Electronic Technology Co., Ltd, Jieyang (CN)

( * ) Notice: Subject to any disclaimer, the term of this patent is extended or adjusted under 35 U.S.C. 154(b) by 0 days.

(21) Appl. No.: 19/219,256

(22) Filed: May 27, 2025

(30) Foreign Application Priority Data

May 15, 2025 (CN) .......................... 202510629671.2

(51) Int. Cl.
| | |
|---|---|
| *C25C 1/00* | (2006.01) |
| *A01N 59/16* | (2006.01) |
| *C25C 1/20* | (2006.01) |
| *C25C 7/02* | (2006.01) |
| *C25C 7/06* | (2006.01) |

(52) U.S. Cl.
CPC ................ *C25C 1/20* (2013.01); *A01N 59/16* (2013.01); *C25C 7/02* (2013.01); *C25C 7/06* (2013.01)

(58) Field of Classification Search
CPC .... C25C 1/20; C25C 7/02; C25C 7/06; A01N 59/16
See application file for complete search history.

(56) References Cited

U.S. PATENT DOCUMENTS

| | | | | |
|---|---|---|---|---|
| 5,614,067 | A | * 3/1997 | Okazaki ................ | C02F 1/4606 204/229.2 |
| 2008/0190374 | A1 | * 8/2008 | Farris ..................... | A01K 7/027 119/74 |

* cited by examiner

*Primary Examiner* — Zulmariam Mendez

(57) ABSTRACT

A silver ion sterilization solution preparation system includes a water inlet pretreatment system and a silver ion sterilization solution generation system. The water inlet pretreatment system includes a water inlet channel, a water outlet channel, and a filtering device. The water inlet channel is in communication with a raw water source. The filtering device is in communication with the water inlet channel and the water outlet channel to filter and treat the raw water source to generate filtered water. The silver ion sterilization solution generation system is used for reacting with the filtered water to generate silver ion sterilization solution. The silver ion sterilization solution generation system includes a silver ion generation water tank and a silver ion sterilization solution storage tank. The silver ion generation water tank is internally equipped with an electrolysis device. The electrolysis device includes a silver anode and a silver cathode.

20 Claims, 8 Drawing Sheets

SILVER ION STERILIZATION SOLUTION PREPARATION SYSTEM

CROSS-REFERENCE TO RELATED APPLICATIONS

The application claims priority of Chinese patent application CN2025106296712, filed on May 15, 2025, which is incorporated herein by reference in its entireties.

TECHNICAL FIELD

The present invention relates to the field of sterilization solution preparation, particularly to a silver ion sterilization solution preparation system.

BACKGROUND ART

Silver ions are widely used in water treatment, medical disinfection, and the purification of daily domestic water due to their antibacterial properties. In the prior art, silver ion generation devices often use electrolysis to oxidize silver electrodes to generate silver ions. However, such systems still have many shortcomings in practical applications. For example, insufficient pretreatment: traditional systems often use single-stage filtration or simple filtration methods, which are difficult to effectively remove large particle impurities (such as sediment and algae) and harmful ions (such as heavy metals like lead and cadmium) from water sources. Water bodies that have not been sufficiently filtered are prone to side reactions with the silver electrodes during the electrolysis process, generating toxic compounds (such as silver oxide precipitates or silver chloride). This not only reduces the efficiency of silver ion generation, but also may contaminate water quality and threaten safety during use. Moreover, during the electrolysis process, the silver at the anode continues to dissolve, while the cathode is prone to accumulate silver deposits due to reduction reactions, resulting in severe unilateral electrode wear and frequent electrode replacement, increasing maintenance costs. The prior art lacks effective electrode protection mechanisms, such as the non-adoption of polarity reversal technology, which makes it impossible to balance the wear rates of the anode and cathode.

Based on this, it is necessary to propose an improved silver ion sterilization solution preparation system, which effectively improves the efficiency of silver ion generation, prolongs equipment lifespan, enhances system reliability, and expands its application scenarios through multi-stage filtration, intelligent control, and structural optimization.

SUMMARY

In order to overcome the shortcomings of the prior art, the present invention provides a silver ion sterilization solution preparation system. This water purification system aims to improve the efficiency of silver ion generation, extend equipment lifespan, enhance system reliability, and expand its application scenarios through multi-stage filtration, intelligent control, and structural optimization.

The technical solution adopted by the present invention to solve its technical problem is as follows.

The present invention provides a silver ion sterilization solution preparation system, including a water inlet pretreatment system and a silver ion sterilization solution generation system.

The water inlet pretreatment system includes a water inlet channel, a water outlet channel, and a filtering device. The water inlet channel is in communication with a raw water source, and the filtering device is in communication with the water inlet channel and the water outlet channel to filter and treat the raw water source to generate filtered water. The silver ion sterilization solution generation system is used for reacting with the filtered water to generate silver ion sterilization solution. The silver ion sterilization solution generation system includes a silver ion generation water tank and a silver ion sterilization solution storage tank.

The silver ion generation water tank is internally equipped with an electrolysis device. The electrolysis device includes a silver anode and a silver cathode. The silver ion generation water tank is in communication with the water outlet channel. The filtered water enters the silver ion generation water tank. The silver anode and the silver cathode undergo an electrolysis reaction to generate the silver ion sterilization solution.

The silver ion sterilization solution storage tank is in communication with the silver ion generation water tank to store the silver ion sterilization solution generated in the silver ion generation water tank.

The silver ion sterilization solution preparation system further includes a control system. The control system includes a liquid level detection unit, a time control unit, and an electromagnetic valve control unit. The liquid level detection unit, the time control unit, and the electromagnetic valve control unit are all electrically connected. The time control unit is used for controlling electrolysis time of the electrolysis device, thereby controlling a concentration of the silver ion sterilization solution. The control system is used for adjusting a water flow path and the startup and shutdown of the water inlet pretreatment system and the silver ion sterilization solution generation system according to a liquid level and the electrolysis time.

Beneficial effects of the present invention are as follows. Through the water inlet pretreatment system, the raw water source is filtered to effectively remove impurities and pollutants in the raw water, providing high-quality filtered water for the subsequent generation of silver ion sterilization solution, thereby improving the purity and safety of water quality. Moreover, the control system monitors a state of the system in real time and intelligently adjusts the startup and shutdown of the equipment and the water flow path based on a feedback signal, so that automated operation is achieved, the complexity of human operation is reduced, and the efficiency of system operation is improved.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
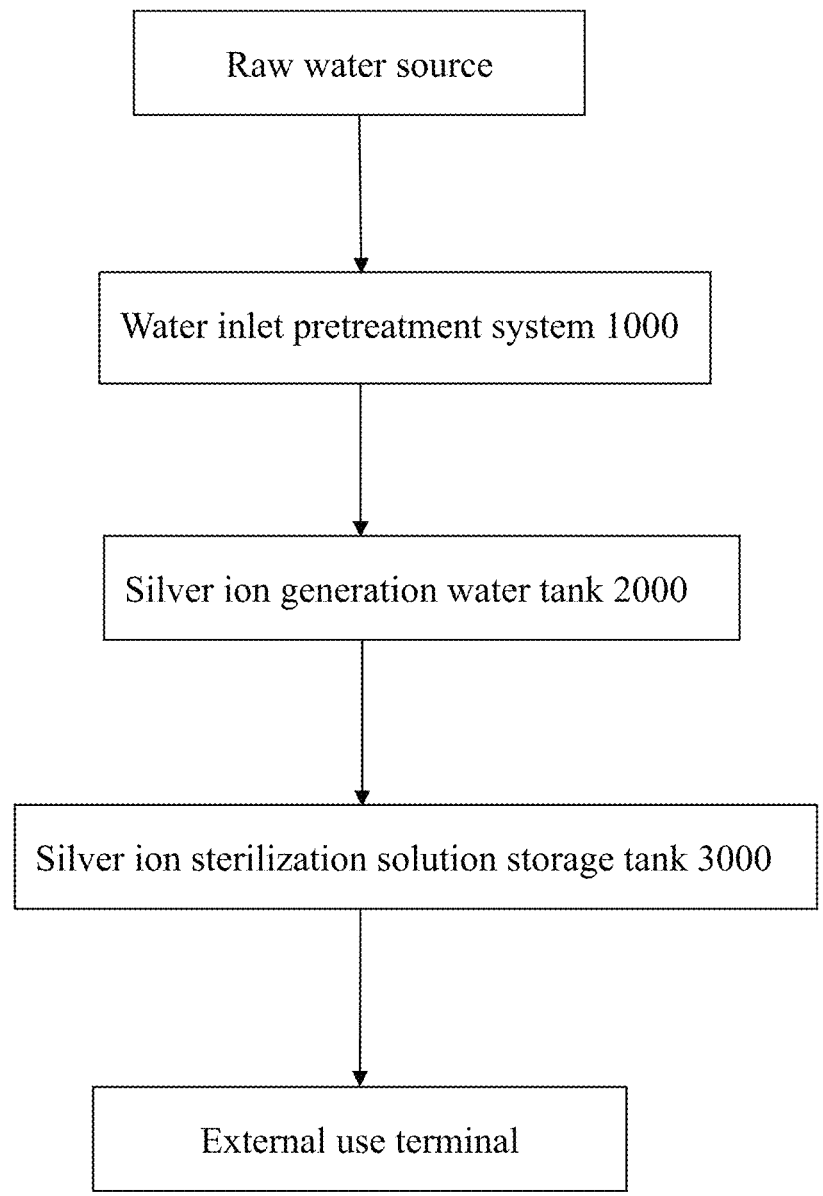
FIG. 1 is a schematic diagram of an overall process of a silver ion sterilization solution preparation system.
Figure 2:
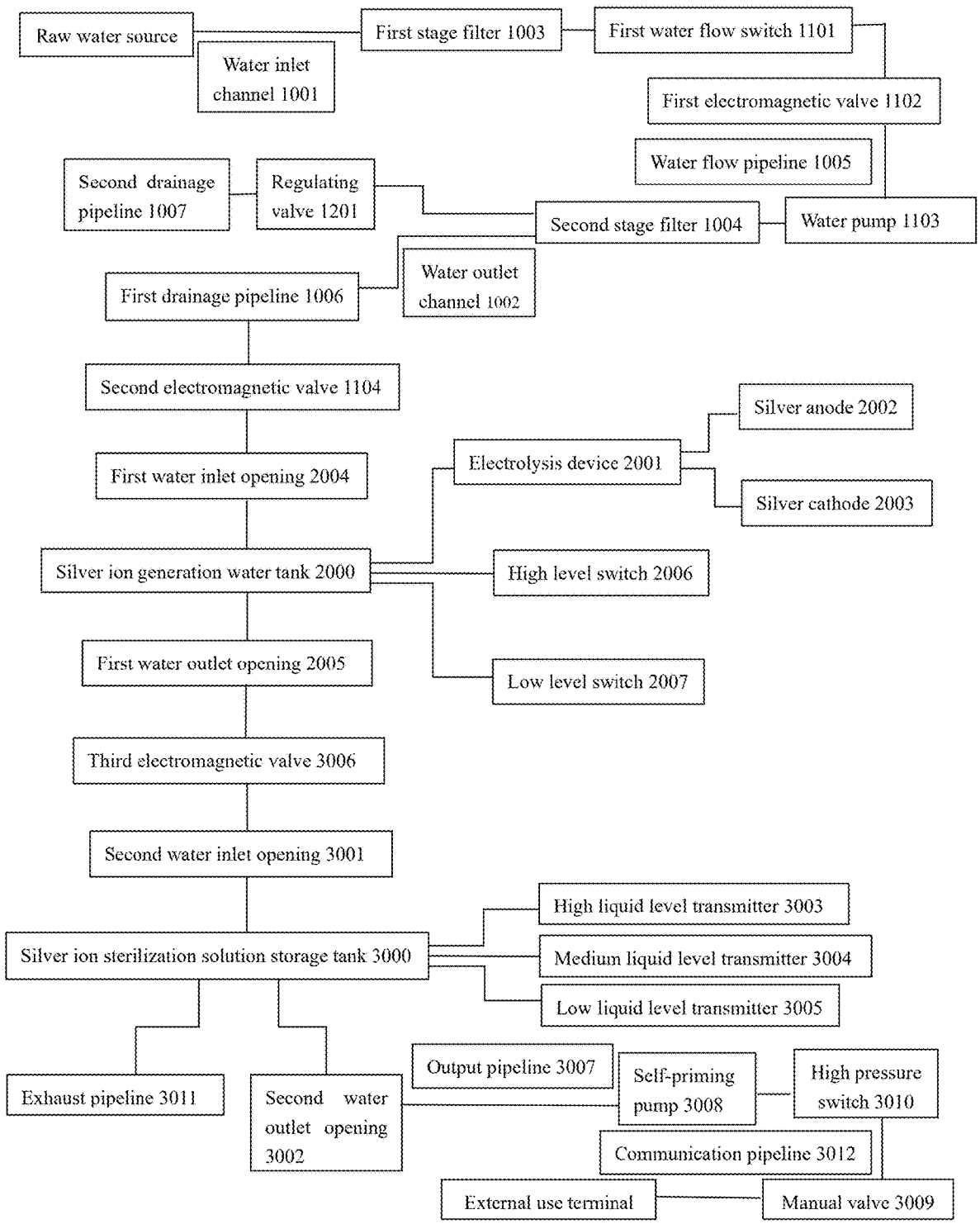
FIG. 2 is a schematic diagram of a specific process of a silver ion sterilization solution preparation system.
Figure 3:
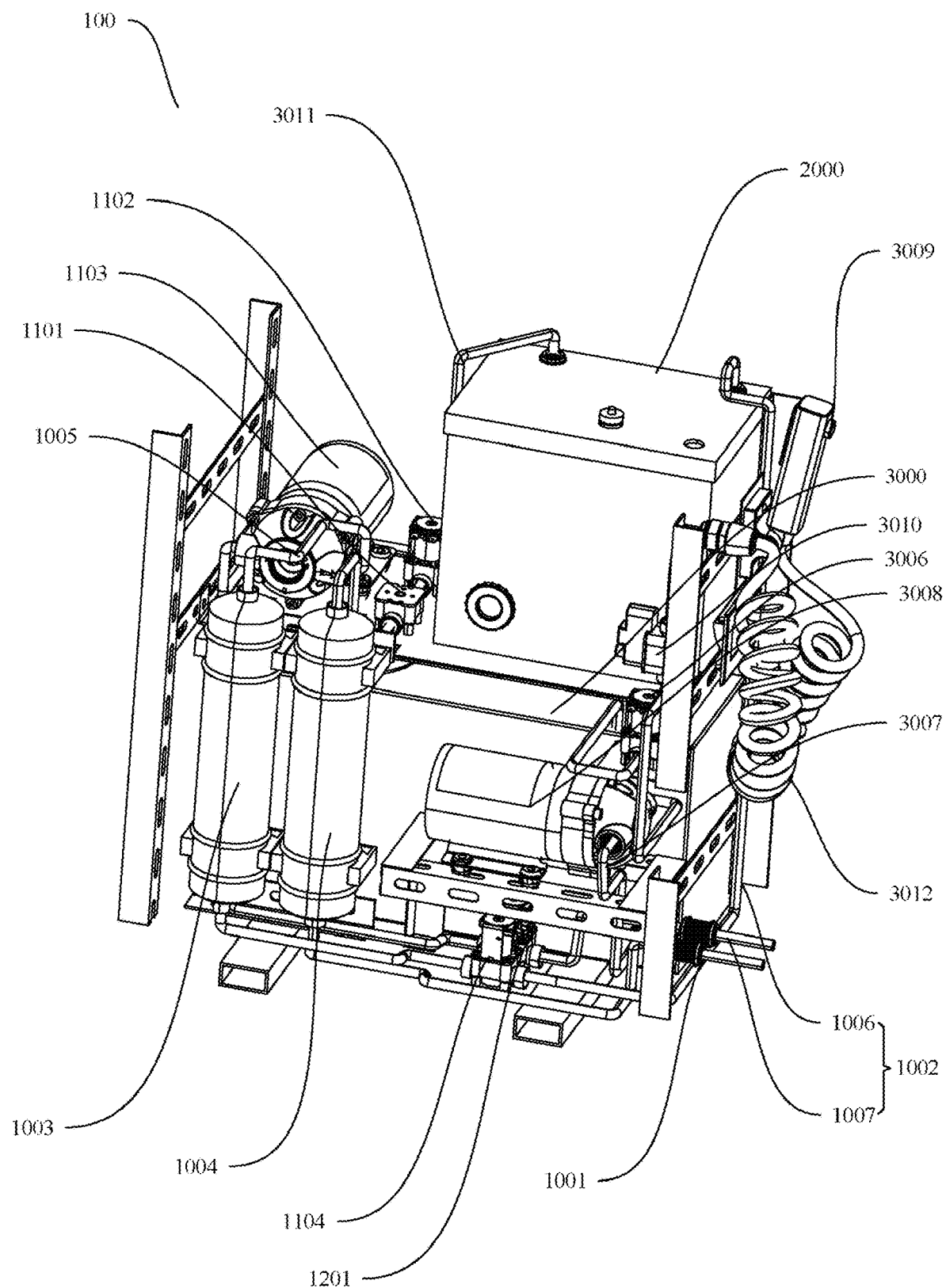
FIG. 3 is a schematic diagram of an overall structure of a silver ion sterilization solution preparation system.
Figure 4:
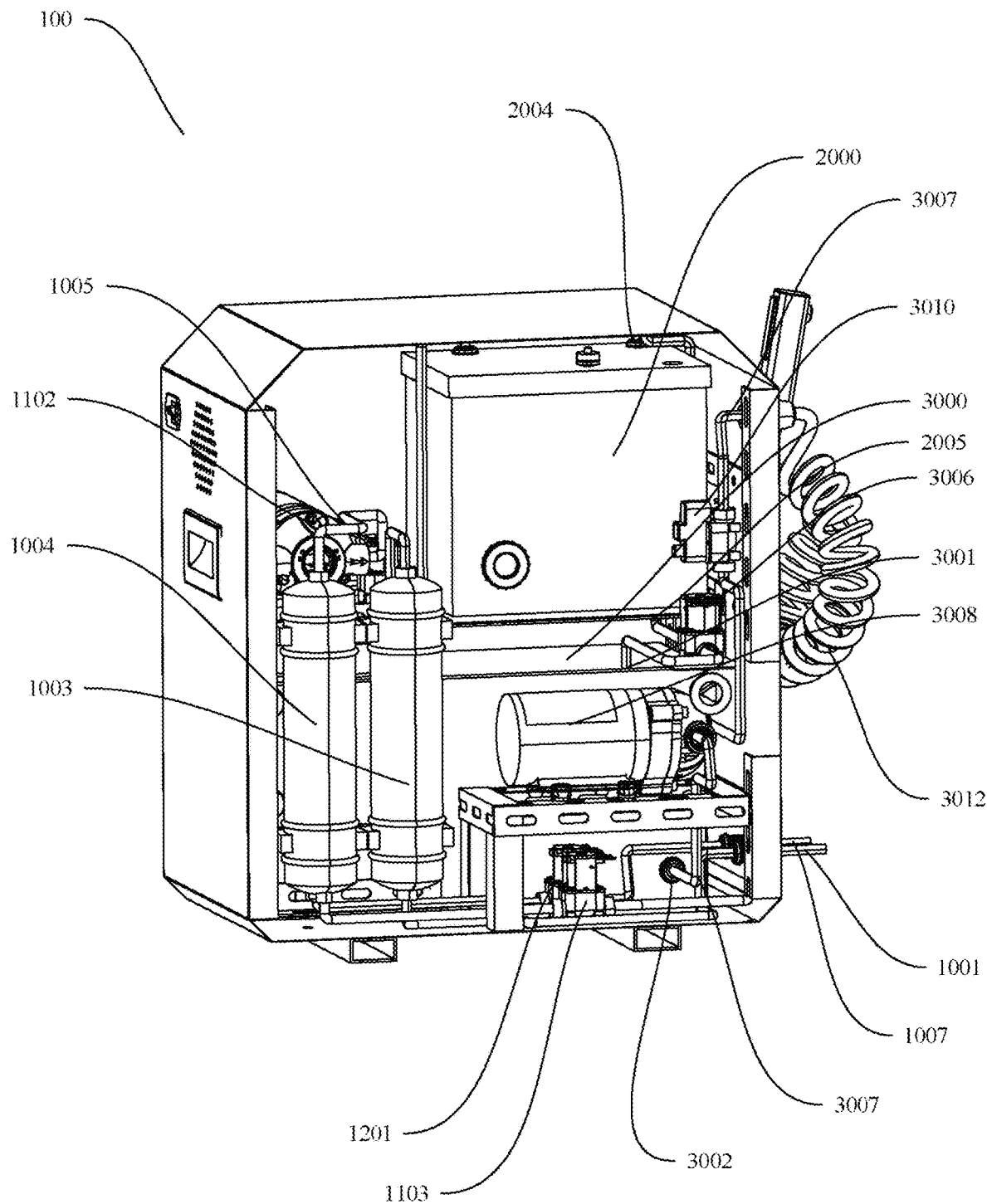
FIG. 4 is a schematic diagram of a structure of a silver ion sterilization solution preparation system from another angle of view.
Figure 5:
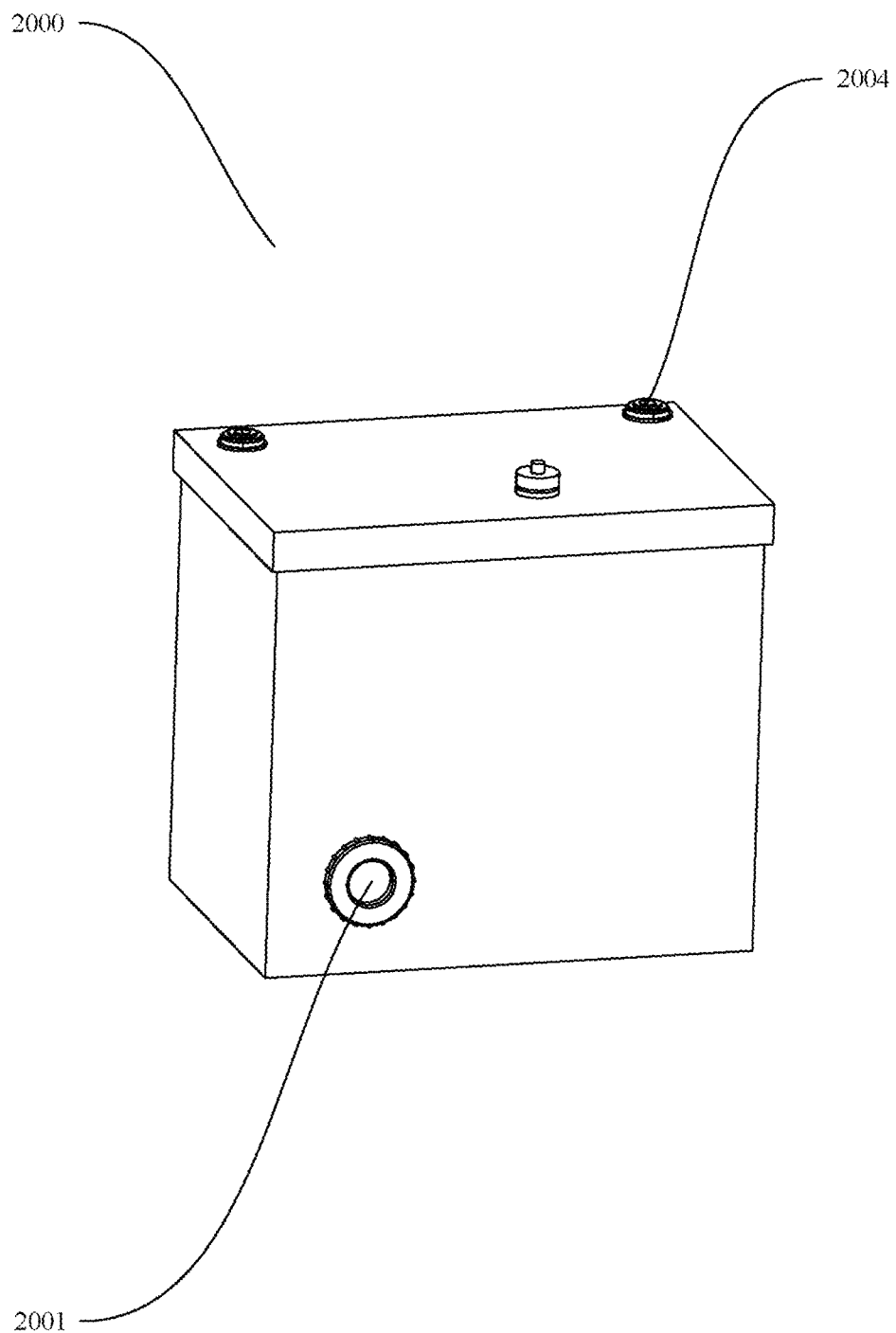
FIG. 5 is a schematic diagram of a structure of a silver ion generation water tank.
Figure 6:
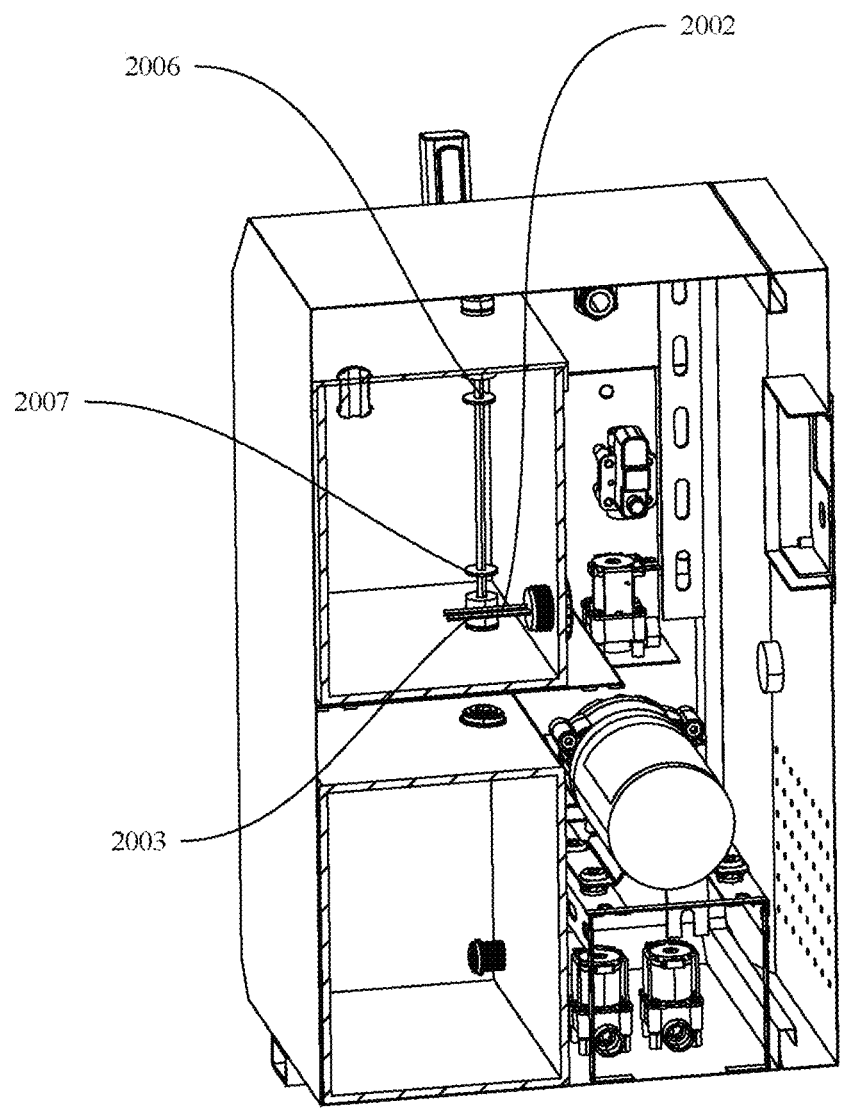
FIG. 6 is a schematic diagram of an internal structure of a silver ion generation water tank.
Figure 7:
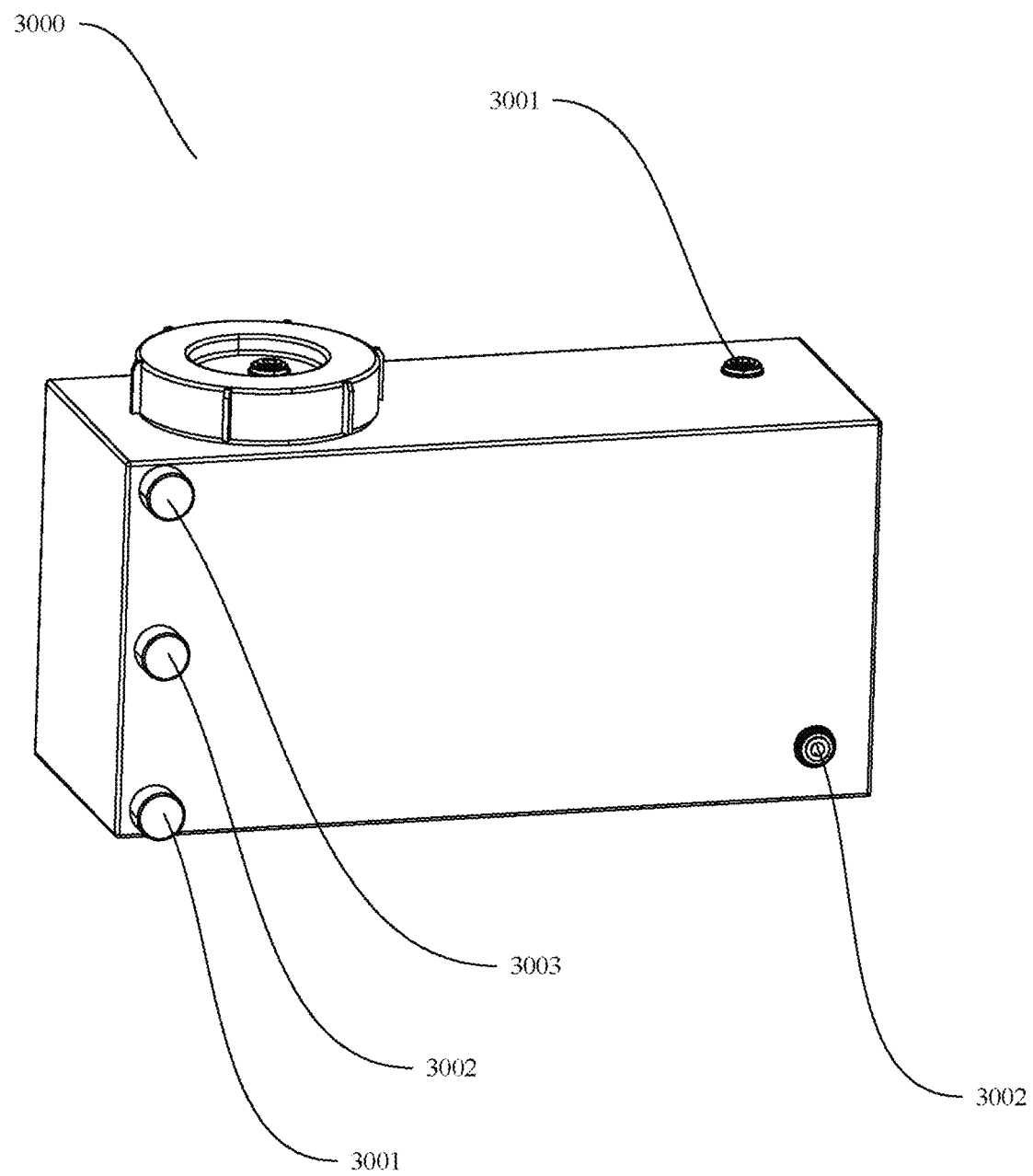
FIG. 7 is a schematic diagram of a structure of a silver ion sterilization solution storage tank.
Figure 8:
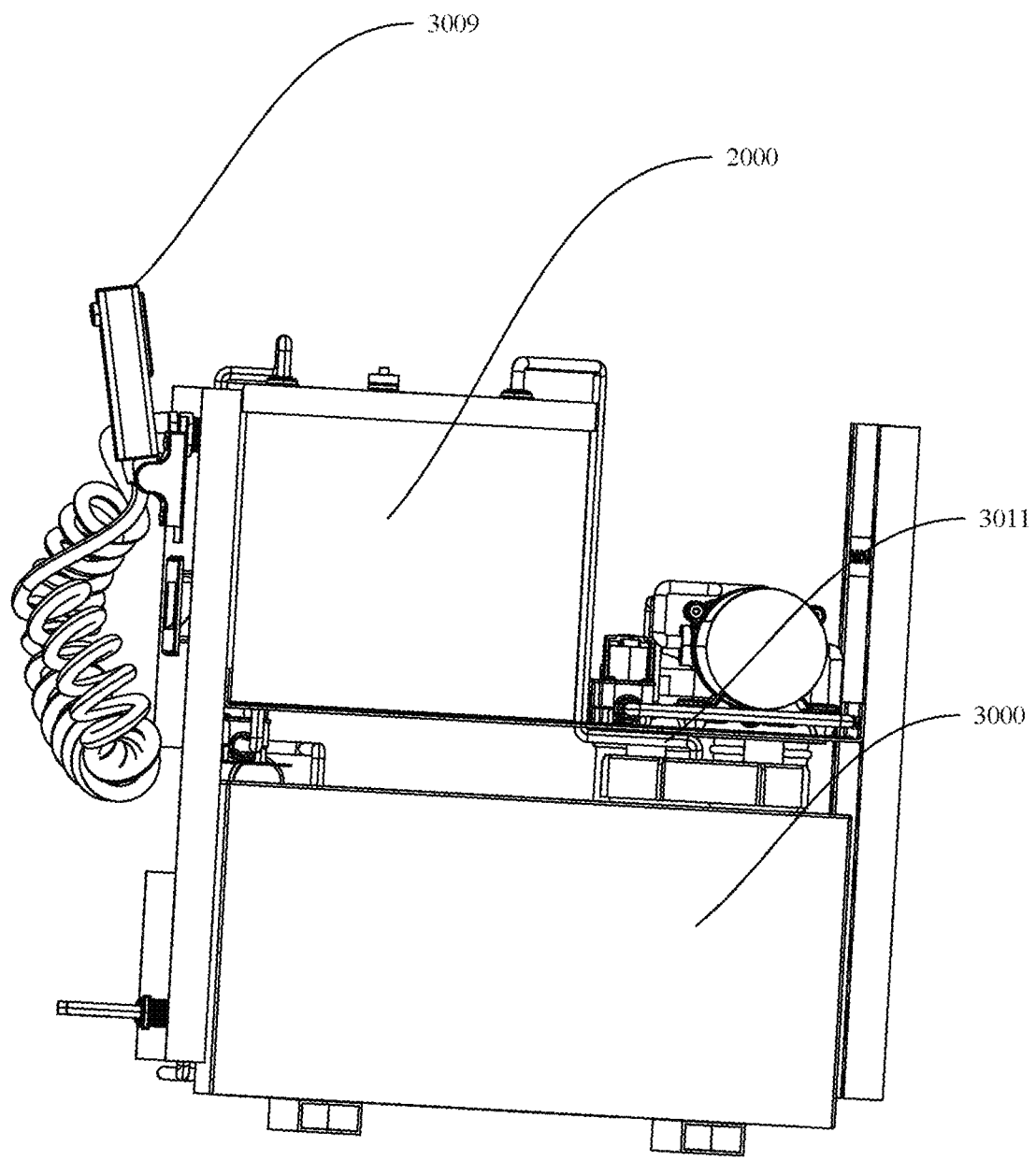
FIG. 8 is a schematic diagram of a connection structure of an exhaust pipeline.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

A silver ion sterilization solution preparation system 100 disclosed in the present invention includes: a water inlet pretreatment system 1000 and a silver ion sterilization solution generation system.

The water inlet pretreatment system 1000 includes a water inlet channel 1001, a water outlet channel 1002, and a filtering device. The water inlet channel 1001 is in communication with a raw water source, and the filtering device is in communication with the water inlet channel 1001 and the water outlet channel 1002 to filter and treat the raw water source to generate filtered water.

The silver ion sterilization solution generation system is used for reacting with the filtered water to generate silver ion sterilization solution. The silver ion sterilization solution generation system includes a silver ion generation water tank 2000 and a silver ion sterilization solution storage tank 3000.

The silver ion generation water tank 2000 is internally equipped with an electrolysis device 2001. The electrolysis device 2001 includes a silver anode 2002 and a silver cathode 2003. The silver ion generation water tank 2000 is in communication with the water outlet channel 1002. The filtered water enters the silver ion generation water tank 2000. The silver anode 2002 and the silver cathode 2003 undergo an electrolysis reaction to generate the silver ion sterilization solution. The silver ion sterilization solution storage tank 3000 is in communication with the silver ion generation water tank 2000 to store the silver ion sterilization solution generated in the silver ion generation water tank 2000.

The silver ion sterilization solution preparation system further includes a control system. The control system includes a liquid level detection unit, a time control unit, and an electromagnetic valve control unit. The liquid level detection unit, the time control unit, and the electromagnetic valve control unit are all electrically connected. The control system is used for adjusting a water flow path and the startup and shutdown of the water inlet pretreatment system 1000 and the silver ion sterilization solution generation system according to a liquid level and electrolysis time. The time control unit is used for controlling the electrolysis time of the electrolysis device 2001, thereby controlling a concentration of the silver ion sterilization solution.

Through the above structure, the raw water source is filtered to effectively remove impurities and pollutants in the raw water, providing high-quality filtered water for the subsequent generation of the silver ion sterilization solution, thereby improving the purity and safety of water quality. Moreover, the control system monitors a status of the system in real time and intelligently adjusts the startup and shutdown of the equipment and the water flow path based on a feedback signal, so that automated operation is achieved, the complexity of human operation is reduced, and the efficiency of system operation is improved.

In this embodiment, the filtering device includes a first stage filter 1003 and a second stage filter 1004. The first stage filter 1003 is in communication with the water inlet channel 1001 for primary filtration of the raw water source. The first stage filter 1003 and the second stage filter 1004 are in communication through a water flow pipeline 1005 for secondary filtration of the water filtered by the first stage filter 1003 to produce filtered water and wastewater. By adopting a two-stage filtration method, the water entering the silver ion generation water tank 2000 meets a quality standard, thereby providing a clean and stable medium for the reaction between the silver anode 2002 and the silver cathode 2003 in the electrolysis process.

In this embodiment, the water outlet channel 1002 includes a first drainage pipeline 1006 and a second drainage pipeline 1007 both in communication with the second stage filter 1004. The first drainage pipeline 1006 is in communication with the silver ion generation water tank 2000. The second drainage pipeline 1007 is used for discharging the filtered wastewater. The first drainage pipeline 1006 ensures that the filtered water meeting requirements after secondary filtration directly enters the silver ion generation water tank 2000, providing a high-purity raw material for subsequent silver ion electrolysis reaction, effectively avoiding electrode blockage or reaction efficiency reduction caused by impurities in the system. The second drainage pipeline 1007 discharges the wastewater containing filter residue and more impurities separately, preventing the wastewater from flowing back to a silver ion generation device and further ensuring the cleanliness and stability of a reaction area.

Through the above structure, the water flow is reasonably diverted, which not only meets the stable supply of reaction water, but also timely discharges wastewater, avoiding repeated pollution of water quality inside the system.

In this embodiment, the first stage filter 1003 is used for primary filtration of the raw water source, removing larger particle pollutants such as sand, soil, leaves, algae, and other larger impurities in the water. The first stage filter 1003 can be of a type such as a mesh filter, a sand filter, a hydrocyclone separator, or a bag filter. An appearance of the first stage filter 1003 can be tubular, tank-type, vertical type, plate-frame, or bag-type. An installation method of the first stage filter 1003 can be vertical or horizontal. A preferred filter material is polypropylene. It should be noted that different types of primary filter materials can be selected according to different inlet water quality and filtration requirements to effectively intercept pollutants in the water.

In this embodiment, the second stage filter 1004 is a reverse osmosis membrane filter or a semi-permeable membrane filter, and is used for removing substances in the water that are prone to react with the silver anode to generate harmful compounds to a human body, such as heavy metals including lead $Pb^{2+}$, cadmium $Cd^{2+}$, mercury $Hg^{2+}$, chromium $Cr^{6+}$, etc. An appearance of the second stage filter 1004 can be tubular, tank-type, vertical type, plate-frame, or bag-type. An installation method of the second stage filter 1004 can be vertical or horizontal. A filter element can be made of polymers like polyamide, polyether sulfone, ceramics, metal oxides, etc. A pore size of the filter element determines the minimum particle size it can intercept, and the pore size of the filter element ranges from the nanometer scale to the micrometer scale for capturing heavy metal ions.

In this embodiment, the water inlet pretreatment system 1000 further includes a first water flow switch 1101 arranged in the water flow pipeline 1005. The first water flow switch 1101 is used for detecting in real time whether a water flow exists in the water flow pipeline 1005 when the system enters a state of producing filtered water. If no water flow is detected, the water production work is stopped by the control system to prevent component damage caused by dry running due to water shortage.

In this embodiment, the electromagnetic valve control unit includes a first electromagnetic valve 1102 arranged in the water flow pipeline 1005. The first electromagnetic valve 1102 is arranged in the water flow pipeline 1005 and positioned before the second stage filter 1004 to control the communication and cutoff of the water flow before the second stage filter 1004.

In this embodiment, a water pump 1103 is also arranged inside the water flow pipeline 1005. The water pump 1103 is used for regulating pressure inside the water flow pipeline 1005. The first electromagnetic valve 1102 is electrically connected to the water pump 1103. When the silver ion generation water tank 2000 triggers a water production signal and transmits the water production signal to the control system, the first electromagnetic valve 1102 and the water pump 1103 are activated, so that the water inlet channel 1001 is in communication with the water flow pipeline 1005, allowing the water to pass through the first stage filter 1003 and then enter the second stage filter 1004 for secondary filtration. When the water flows from the first stage filter 1003 to the second stage filter 1004, the first water flow switch 1101 detects a water flow signal in real time, so as to ensure that the water inlet pretreatment system 1000 has sufficient water inflow, and to enable the water to efficiently pass through the second stage filter 1004 and complete the filtration. As a preferred option, the water pump 1103 can be a self-priming pump or a booster pump.

Specifically, when a low level switch 2007 of the silver ion generation water tank 2000 detects that a water level is low, the control system respectively activates the second electromagnetic valve 1104 and the first electromagnetic valve 1102 to open the water flow pipeline 1005, and the water pump 1103 is activated to provide sufficient pressure for the water inlet pretreatment system 1000, allowing water to enter the second stage filter 1004 through the first stage filter for secondary filtration, and ensuring that the water can efficiently pass through the second stage filter 1004 and complete the filtration while the water flows from the first stage filter 1003 to the second stage filter 1004.

As a preferred option of this embodiment, the water pump 1103 can be a self-priming pump. The self-priming pump works to generate negative pressure to draw in an external raw water source, and the raw water sequentially passes through the water inlet channel 1001, the first stage filter 1003, the first water flow switch 1101, and the first electromagnetic valve 1102 to enter the self-priming pump, and then enters the second stage filter 1004 for filtration.

As another preferred option of this embodiment, the water pump 1103 can also be a booster pump. At this time, the raw water source has sufficient pressure to enter the booster pump through the water inlet channel 1001, the first stage filter 1003, the first water flow switch 1101, and the first electromagnetic valve 1102 in sequence. The booster pump works to provide sufficient pressure to ensure that the liquid can be efficiently filtered through the second stage filter 1004.

Through the above structure, it is ensured that both water flow state and pressure during the process from the first stage filter 1003 to the second stage filter 1004 are effectively monitored and regulated, and the response speed and the operation stability of the system are improved through automatic control, ultimately providing reliable guarantees for the subsequent preparation of the silver ion sterilization solution.

In this embodiment, the second drainage pipeline 1007 is provided with a regulating valve 1201. The regulating valve 1201 is used for adjusting and controlling a discharge amount of wastewater generated by the second stage filter 1004. By regulating the discharge amount of the wastewater, it is possible to avoid the accumulation of the wastewater in the filtration system, thereby preventing pollutant backflow or secondary pollution. This not only timely eliminates impurities in the filter, but also maintains the purification effect of the secondary filtration, providing high-quality water for the subsequent generation of the silver ion sterilization solution.

In this embodiment, the silver ion generation water tank 2000 is provided with a first water inlet opening 2004 and a first water outlet opening 2005. The first drainage pipeline 1006 is in communication with the first water inlet opening 2004, allowing filtered water to enter the silver ion generation water tank 2000 and undergo an electrolysis reaction with the silver anode 2002 and the silver cathode 2003 to generate silver ion sterilization solution. The first water outlet opening 2005 is in communication with the silver ion sterilization solution storage tank 3000, allowing the silver ion sterilization solution to flow into the silver ion sterilization solution storage tank 3000 for storage.

As a preferred option of this embodiment, after the electrolysis device 2001 is powered on, the filtered water in the silver ion generation water tank 2000 is electrolyzed by a current flowing from the silver anode 2002 to the silver cathode 2003. A surface of the silver anode 2002 undergoes an oxidation reaction to generate silver ions. A part of the silver ions obtain electrons at the silver cathode 2003 and undergo a reduction reaction to produce silver atoms, while another part of the silver ions that do not participate in the reduction at the silver cathode 2003 are free (distributed) in the silver ion generation water tank 2000 to generate the silver ion sterilization solution. Using the silver cathode as a counter electrode can avoid side reactions caused by the use of different metal materials, such as the leaching or unexpected deposition of other metal ions. This not only ensures the balance of electrochemical reaction, but also prevents the introduction of impurities in the system that may interfere with the bactericidal effect of the silver ions, ensuring that the concentration of the output silver ions is stable and controllable.

Specifically, when current passes through the electrolysis device 2001, the reaction occurring at the silver anode 2002 is $Ag-e^-=Ag^+$. At the silver cathode 2003, a part of the silver ions obtain electrons in the solution and undergo the reduction reaction to regenerate silver, and the chemical reaction equation is: $Ag^++e^-=Ag$. The silver ions $Ag^+$ that did not participate in the reduction reaction at the silver cathode 2003 are free (distributed) in the filtered water, forming the silver ion sterilization solution with strong bactericidal properties. The silver ions can destroy cell metabolism by binding to proteins of bacterial cell walls, thereby achieving a bactericidal effect. The filtered water in the silver ion generation water tank 2000 contains various ions such as chloride ions $Cl^-$, calcium ions $Ca^{2+}$, magnesium ions $Mg^{2+}$, and hydroxide ions $OH^-$. These ions are free charge carriers in the solution, providing good conductivity. The electrolysis process is affected by the conductivity of the solution, while the ions in the filtered water can reduce the resistance of an electrolyte, thereby improving an overall reaction rate.

In this embodiment, the silver ion generation water tank 2000 is also equipped with a timing controller and an electronic switch. The electronic switch is used for making the silver anode 2002 and the silver cathode 2003 undergo electrode reversal. The timing controller, the electronic switch, and the electrolysis device 2001 are all electrically connected. The timing controller controls the electronic switch to make the silver anode 2002 and the silver cathode 2003 realize the electrode reversal according to a preset electrolysis time. Through the automated electrode reversal, not only the deactivation problem of silver electrodes is solved, but also the electrolysis efficiency, the product quality, and the equipment lifespan are improved, and the process controllability and environmental friendliness are enhanced at the same time.

In this embodiment, the electromagnetic valve control unit further includes a second electromagnetic valve 1104 arranged on the first drainage pipeline 1006. The second electromagnetic valve 1104 is used for controlling the communication and cutoff of the filtered water entering the silver ion generation water tank 2000.

In this embodiment, the liquid level detection unit includes a high level switch 2006 and a low level switch 2007 both arranged in the silver ion generation water tank 2000. Both the high level switch 2006 and the low level switch 2007 are used for monitoring a liquid level in the water tank.

Specifically, the second electromagnetic valve 1104 is electrically connected to the high level switch 2006 and the low level switch 2007. When the water level in the silver ion generation tank 2000 reaches a preset highest point, the filtering device is triggered to stop producing water. When the water level in the silver ion generation tank 2000 reaches a preset lowest point, the filtering device is triggered to start producing water.

Specifically, when the water level in the silver ion generation water tank 2000 reaches the preset lowest point, water production is triggered. When the water level in the silver ion generation water tank 2000 is lower than the preset lowest point, the low level switch 2007 triggers a signal and transmits the signal to the control system, and the second electromagnetic valve 1104 is turned on. At the same time, the first electromagnetic valve 1102 and the water pump 1103 start working to filter the raw water source and produce filtered water, and the filtered water enters the silver ion generation water tank 2000 to start water production. When the filtered water enters the silver ion generation water tank 2000 and reaches the preset highest point, the high level switch 2006 triggers a signal and transmits the signal to the control system, and the second electromagnetic valve 1104 is turned off. At the same time, the first electromagnetic valve 1102 and the water pump 1103 stop working, the raw water source stops filtering, and the silver ion generation water tank 2000 stops water production.

By monitoring the liquid level in the water tank in real time and controlling the supply of the filtered water, equipment wear caused by unstable water quality or excessive water ingress can be reduced, extending the service life of the silver ion generation device and other components, allowing the water supply, the water cut-off and the subsequent silver ion sterilization solution generation process to be highly synchronized, and ensuring stable cooperation among all links.

In this embodiment, the silver ion sterilization solution storage tank 3000 is provided with a second water inlet opening 3001 and a second water outlet opening 3002. The second water inlet opening 3001 is in communication with the first water outlet opening 2005, allowing the silver ion sterilization solution to flow into the silver ion sterilization solution storage tank 3000 for storage.

In this embodiment, the liquid level detection unit further includes a high liquid level transmitter 3003, a medium liquid level transmitter 3004, and a low liquid level transmitter 3005 all arranged in the silver ion sterilization solution storage tank 3000. The high liquid level transmitter 3003, the medium liquid level transmitter 3004, and the low liquid level transmitter 3005 are used for monitoring a liquid level height of the silver ion sterilization solution in the silver ion sterilization solution storage tank 3000 in real time. When the silver ion sterilization solution in the silver ion sterilization solution storage tank 3000 is at a preset low level, the low liquid level transmitter 3005 generates a signal and transmits the signal to the control system, so as to control the silver ion sterilization solution storage tank 3000 to stop outputting the silver ion sterilization solution outwards. In this embodiment, the electromagnetic valve control unit further includes a third electromagnetic valve 3006 disposed between the second water inlet opening 3001 and the first water outlet opening 2005. The third electromagnetic valve 3006 is used for controlling the cutoff and communication of the silver ion sterilization solution from the silver ion generation water tank 2000 to the silver ion sterilization solution storage tank 3000. The high liquid level transmitter 3003, the medium liquid level transmitter 3004, and the low liquid level transmitter 3005 are electrically connected to the third electromagnetic valve 3006. When the preparation of the silver ion sterilization solution is not completed in the silver ion generation water tank 2000, the third electromagnetic valve 3006 is in an off state. When the electrolysis device 2001 is powered on to prepare the silver ion sterilization solution, and the high level switch 2006 is triggered, the third electromagnetic valve 3006 is in an on state. As a preferred option, the third electromagnetic valve 3006 is a normally-on valve to ensure that the silver ion sterilization solution can continuously flow from the silver ion generation water tank 2000 into the silver ion sterilization solution storage tank 3000.

Through the above structure, precise adjustment of the supply of the silver ion sterilization solution is achieved, the stability and safety of the internal liquid level of the system are ensured, and the liquid supply can be supplemented or stopped in time according to actual needs, thereby improving the stability, efficiency, and product quality of the entire silver ion sterilization solution generation and storage system. Meanwhile, modular design and closed-loop control make the system easier to manage, maintain, and expand in the future.

In this embodiment, the second water outlet opening 3002 is connected to an output pipeline 3007. The silver ion sterilization solution is transported outside through the output pipeline 3007. The output pipeline 3007 is equipped with a self-priming pump 3008, a manual valve 3009, and a high pressure switch 3010. The self-priming pump 3008 is used for drawing the silver ion sterilization solution from the silver ion sterilization solution storage tank 3000. The manual valve 3009 is used for controlling the outflow of the silver ion sterilization solution from the silver ion sterilization solution storage tank 3000. The self-priming pump 3008 is in communication with the manual valve 3009 through a communication pipeline 3012. The high pressure switch 3010 is used for monitoring pressure inside the communication pipeline 3012. When the pressure inside the communication pipeline 3012 is too high, the high pressure switch 3010 triggers a signal and transmits the signal to the control system to cause the self-priming pump 3008 to shut down and stop working. When a liquid level height of the silver ion sterilization solution in the silver ion sterilization solution storage tank 3000 is lower than a preset minimum liquid level, the low liquid level transmitter 3005 generates a signal and transmits the signal to the control system to lock the self-priming pump 3008, causing the self-priming pump 3008 to stop working to avoid equipment damage.

Specifically, when the manual valve 3009 is turned on, pressure in the output pipeline 3007 decreases, and the high pressure switch 3010 controls the self-priming pump 3008 to activate and draw the silver ion sterilization solution from the silver ion sterilization solution storage tank 3000. When the manual valve 3009 is turned off, the high pressure switch 3010 controls the self-priming pump 3008 to shut down and stop working. When the silver ion sterilization solution storage tank 3000 is at a preset liquid level, the low liquid level transmitter 3005 triggers a signal and transmits the signal to the control system to make the self-priming pump 3008 shut down and stop working to avoid equipment damage. Through the above structure, it is ensured that the silver ion sterilization solution can be safely and stably output outside, and a response can be made quickly in abnormal situations, thereby protecting equipment and extending a service life, while achieving energy-saving and efficient automated management. In this embodiment, the silver ion sterilization solution storage tank 3000 is also equipped with an exhaust pipeline 3011. The exhaust pipeline 3011 is used for balancing air pressure when water enters and exits the silver ion sterilization solution storage tank 3000. The exhaust pipeline 3011 is capable of releasing excess gas generated due to liquid flow, temperature changes, or changes in gas solubility, ensuring pressure balance inside and outside the silver ion sterilization solution storage tank, and preventing excessive internal pressure or negative pressure from affecting liquid flow or damaging the structure of the storage tank.

In this embodiment, the control system further includes a sensor device. The sensor device is used for monitoring the pH value, electrical conductivity, total dissolved solids (TDS), and silver ion concentration of electrolyzed water in real time.

A water inlet pretreatment stage in the present invention ensures the water quality for the electrolysis reaction. The two-stage filtration method is used, the wastewater is reasonably discharged, the filtered water is directed to the silver ion generation water tank 2000 for the electrolysis reaction to generate the silver ion sterilization solution, and the silver ion sterilization solution is then directed to the silver ion sterilization solution storage tank 3000 for storage. Moreover, through the overall control system's linkage of various sensors, liquid level switches, pressure switches, and electromagnetic valves, automatic, closed-loop, and intelligent management is achieved, making the entire silver ion sterilization solution preparation process efficient and safe.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A silver ion sterilization solution preparation system, comprising:
    a water inlet pretreatment system, wherein the water inlet pretreatment system comprises a water inlet channel, a water outlet channel, and a filtering device; the water inlet channel is in communication with a raw water source, and the filtering device is in communication with the water inlet channel and the water outlet channel to filter and treat the raw water source to generate filtered water;
    a silver ion sterilization solution generation system, wherein the silver ion sterilization solution generation system is used for reacting with the filtered water to generate silver ion sterilization solution; the silver ion sterilization solution generation system comprises a silver ion generation water tank and a silver ion sterilization solution storage tank; the silver ion generation water tank is internally equipped with an electrolysis device; the electrolysis device comprises a silver anode and a silver cathode; the silver ion generation water tank is in communication with the water outlet channel; the filtered water enters the silver ion generation water tank; and the silver anode and the silver cathode undergo an electrolysis reaction to generate the silver ion sterilization solution; and the silver ion sterilization solution storage tank is in communication with the silver ion generation water tank to store the silver ion sterilization solution generated in the silver ion generation water tank; and
    a control system, wherein the control system comprises a liquid level detection unit, a time control unit, and an electromagnetic valve control unit; the liquid level detection unit, the time control unit, and the electromagnetic valve control unit are all electrically connected; the time control unit is used for controlling electrolysis time of the electrolysis device, thereby controlling a concentration of the silver ion sterilization solution; and the control system is used for adjusting a water flow path and the startup and shutdown of the water inlet pretreatment system and the silver ion sterilization solution generation system according to a liquid level and the electrolysis time.

2. The silver ion sterilization solution preparation system according to claim 1, wherein the filtering device comprises a first stage filter and a second stage filter; the first stage filter is in communication with the water inlet channel for primary filtration of the raw water source; and the first stage filter and the second stage filter are in communication through a water flow pipeline for secondary filtration of the water filtered by the first stage filter to produce filtered water and wastewater.

3. The silver ion sterilization solution preparation system according to claim 2, wherein the water outlet channel comprises a first drainage pipeline and a second drainage pipeline both in communication with the second stage filter; the first drainage pipeline is in communication with the silver ion generation water tank; and the second drainage pipeline is used for discharging the filtered wastewater.

4. The silver ion sterilization solution preparation system according to claim 3, wherein the first stage filter is a mesh filter, a sand filter, a hydrocyclone separator, or a bag filter, and is used for performing primary filtration on the raw water source to remove large particle pollutants in the water; and the second stage filter is a reverse osmosis membrane filter or a semi-permeable membrane filter, and is used for removing substances in the water that are prone to react with the silver anode to generate harmful compounds to a human body.

5. The silver ion sterilization solution preparation system according to claim 4, wherein the water inlet pretreatment system further comprises a first water flow switch arranged in the water flow pipeline; and the first water flow switch is used for detecting a water flow in the water flow pipeline, so as to control the liquid to pass through the first stage filter smoothly and enter the second stage filter for filtration.

6. The silver ion sterilization solution preparation system according to claim 5, wherein an electromagnetic valve control unit comprises a first electromagnetic valve arranged in the water flow pipeline; and the first electromagnetic valve is arranged in the water flow pipeline and positioned before the second stage filter to control the communication and cutoff of the water flow before the second stage filter.

7. The silver ion sterilization solution preparation system according to claim 6, wherein a water pump is also arranged inside the water flow pipeline; the water pump is used for regulating pressure inside the water flow pipeline; the first electromagnetic valve is electrically connected to the water pump; when the silver ion generation water tank triggers a water production signal and transmits the water production signal to the control system, the first electromagnetic valve and the water pump are activated, so that the water inlet channel is in communication with the water flow pipeline, allowing the water to pass through the first stage filter and then enter the second stage filter for secondary filtration; and when the water flows from the first stage filter to the second stage filter, the first water flow switch detects a water flow signal in real time, so as to ensure that the water inlet pretreatment system has sufficient water inflow, and to enable the water to efficiently pass through the second stage filter and complete the filtration.

8. The silver ion sterilization solution preparation system according to claim 7, wherein the second drainage pipeline is provided with a regulating valve; and the regulating valve is used for adjusting and controlling a discharge amount of wastewater generated by the second stage filter.

9. The silver ion sterilization solution preparation system according to claim 8, wherein the silver ion generation water tank is provided with a first water inlet opening and a first water outlet opening; the first drainage pipeline is in communication with the first water inlet opening, allowing filtered water to enter the silver ion generation water tank and undergo an electrolysis reaction with the silver anode and the silver cathode to generate silver ion sterilization solution; and the first water outlet opening is in communication with the silver ion sterilization solution storage tank, allowing the silver ion sterilization solution to flow into the silver ion sterilization solution storage tank for storage.

10. The silver ion sterilization solution preparation system according to claim 9, wherein after the electrolysis device is powered on, the filtered water in the silver ion generation water tank is electrolyzed by a current flowing from the silver anode to the silver cathode; a surface of the silver anode undergoes an oxidation reaction to generate silver ions; a part of the silver ions obtain electrons at the silver cathode and undergo a reduction reaction to produce silver atoms, while another part of the silver ions that do not participate in the reduction at the silver cathode are free in the silver ion generation water tank to generate the silver ion sterilization solution; the silver ion generation water tank is also equipped with a timing controller and an electronic switch; the electronic switch is used for making the silver anode and the silver cathode undergo electrode reversal; the timing controller, the electronic switch, and the electrolysis device are all electrically connected; and the timing controller controls the electronic switch to make the silver anode and the silver cathode realize the electrode reversal according to a preset electrolysis time.

11. The silver ion sterilization solution preparation system according to claim 10, wherein the electromagnetic valve control unit further comprises a second electromagnetic valve arranged on the first drainage pipeline; and the second electromagnetic valve is used for controlling the communication and cutoff of the filtered water entering the silver ion generation water tank.

12. The silver ion sterilization solution preparation system according to claim 11, wherein the liquid level detection unit comprises a high level switch and a low level switch both arranged in the silver ion generation water tank; and both the high level switch and the low level switch are used for monitoring a liquid level in the water tank.

13. The silver ion sterilization solution preparation system according to claim 12, wherein the second electromagnetic valve is electrically connected to the high level switch and the low level switch; when the water level in the silver ion generation tank reaches a preset highest point, the filtering device is triggered to stop producing water; when the water level in the silver ion generation tank reaches a preset lowest point, the filtering device is triggered to start producing water, the low level switch triggers a signal and transmits the signal to the control system, the second electromagnetic valve is turned on, at the same time, the first electromagnetic valve is turned on, the water pump starts working to filter the raw water source and produce filtered water, and the filtered water enters the silver ion generation water tank to start water production; when the filtered water enters the silver ion generation water tank and reaches the preset highest point, the high level switch triggers a signal and transmits the signal to the control system, the second electromagnetic valve is turned off, at the same time, the first electromagnetic valve is turned off, the water pump stops working, the raw water source stops filtering, and the silver ion generation water tank stops water production.

14. The silver ion sterilization solution preparation system according to claim 13, wherein the silver ion sterilization solution storage tank is provided with a second water inlet opening and a second water outlet opening; and the second water inlet opening is in communication with the first water outlet opening, allowing the silver ion sterilization solution to flow into the silver ion sterilization solution storage tank for storage.

15. The silver ion sterilization solution preparation system according to claim 14, wherein the liquid level detection unit further comprises a high liquid level transmitter, a medium liquid level transmitter, and a low liquid level transmitter all arranged in the silver ion sterilization solution storage tank; the high liquid level transmitter, the medium liquid level transmitter, and the low liquid level transmitter are used for monitoring a height of the silver ion sterilization solution in the silver ion sterilization solution storage tank in real time; and when the silver ion sterilization solution in the silver ion sterilization solution storage tank is at a preset low level, the low liquid level transmitter generates a signal and transmits the signal to the control system, so as to control the silver ion sterilization solution storage tank to stop outputting the silver ion sterilization solution outwards.

16. The silver ion sterilization solution preparation system according to claim 15, wherein the electromagnetic valve control unit further comprises a third electromagnetic valve disposed between the second water inlet opening and the first water outlet opening; and the third electromagnetic valve is used for controlling the cutoff and communication of the silver ion sterilization solution from the silver ion generation water tank to the silver ion sterilization solution storage tank.

17. The silver ion sterilization solution preparation system according to claim 16, wherein the second water outlet opening is connected to an output pipeline; the silver ion sterilization solution is transported outside through the output pipeline; the output pipeline is equipped with a self-priming pump, a manual valve, and a high pressure switch; the self-priming pump is used for drawing the silver ion sterilization solution from the silver ion sterilization solution storage tank; the manual valve is used for controlling the outflow of the silver ion sterilization solution from the silver ion sterilization solution storage tank; the self-priming pump is in communication with the manual valve through a communication pipeline; the high pressure switch is used for monitoring pressure inside the communication pipeline; when the pressure inside the communication pipeline is too high, the high pressure switch triggers a signal and transmits the signal to the control system to cause the self-priming pump to shut down and stop working; and when a liquid level height of the silver ion sterilization solution in the silver ion sterilization solution storage tank is lower than a preset minimum liquid level, the low liquid level transmitter generates a signal and transmits the signal to the control system to cause the self-priming pump to stop working.

18. The silver ion sterilization solution preparation system according to claim 17, wherein when the manual valve is turned on, pressure in the output pipeline decreases, and the high pressure switch controls the self-priming pump to activate and draw the silver ion sterilization solution from the silver ion sterilization solution storage tank; and when the manual valve is turned off, the high pressure switch controls the self-priming pump to shut down and stop working.

19. The silver ion sterilization solution preparation system according to claim 18, wherein the silver ion sterilization solution storage tank is also equipped with an exhaust pipeline; and the exhaust pipeline is used for balancing air pressure when water enters and exits the silver ion sterilization solution storage tank.

20. The silver ion sterilization solution preparation system according to claim 1, wherein the control system further comprises a sensor device; and the sensor device is used for monitoring the pH value, electrical conductivity, total dissolved solids, and silver ion concentration of electrolyzed water in real time.

* * * * *